United States Patent [19]

Jackson

[11] 4,183,706
[45] Jan. 15, 1980

[54] AGITATOR FOR STORAGE BIN UNLOADERS

[76] Inventor: William Jackson, P.O. Box 444, Nye, Mont. 59061

[21] Appl. No.: 6,764

[22] Filed: Jan. 26, 1979

[51] Int. Cl.² ............................................. B65G 65/70
[52] U.S. Cl. ................................. 414/311; 366/195
[58] Field of Search ............... 239/683; 414/310, 311, 414/312; 366/186, 184, 190, 194, 195, 196

[56] References Cited

U.S. PATENT DOCUMENTS

| | | | |
|---|---|---|---|
| 1,274,548 | 8/1918 | McClure | 198/582 |
| 2,790,563 | 4/1957 | McCarthy | 414/312 |
| 3,155,247 | 11/1964 | Patterson | 414/319 |
| 3,259,538 | 7/1966 | Schnyder | 162/19 |
| 3,289,862 | 12/1966 | Weaver | 414/311 |
| 3,647,094 | 3/1972 | Jackson | 414/312 |
| 4,103,788 | 8/1978 | Sutton | 414/309 |

*Primary Examiner*—Robert W. Jenkins
*Attorney, Agent, or Firm*—Wells, St. John & Roberts

[57] ABSTRACT

An agitator assembly mountable to the forward side of a circular bin unloading device in relation to pivoting of the device about a vertical central axis of the bin. Agitator bars of the present agitator are powered to rotate to engage and break up clumps of particulate material prior to engagement of the material with auger assemblies of the unloading device. Adjusting brackets mount the agitator assembly to the auger assembly to facilitate elevational adjustment of the agitator relative to the bin floor.

7 Claims, 4 Drawing Figures

U.S. Patent  Jan. 15, 1980  4,183,706
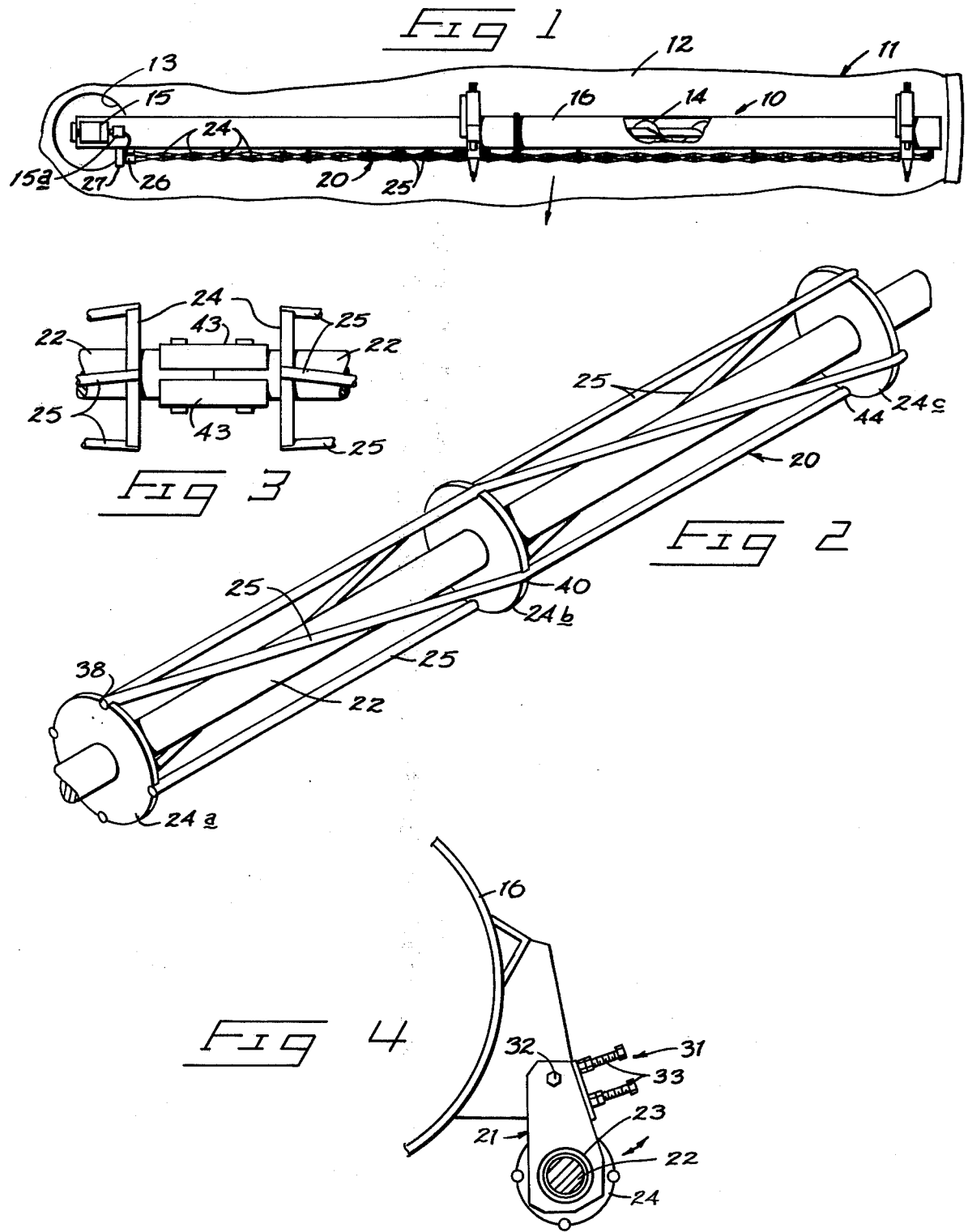

AGITATOR FOR STORAGE BIN UNLOADERS

BACKGROUND OF THE INVENTION

The present invention is related to agitators for breaking up compacted or clumps of particulate material within a storage bin ahead of a bin unloader assembly.

Present particulate storage containers have capacities for receiving bulk quantities of particulate material such as grain, corn, or beans, to heights greater than 80 feet. This results in extremely high pressure on the material near the bin floor. Particularly in the case of beans, compaction causes matting or caking of the material along the bin floor. The caked product tends to impede or at least slow down normal auger type unloader assemblies.

An object of this invention is to provide an agitator mechanism by which the clumps of compacted particulate material are broken up into flowable particulates prior to engagement thereof by the unloader assembly.

BRIEF DESCRIPTION OF THE DRAWINGS

A preferred form of the present invention is illustrated in the accompanying drawings, in which:

FIG. 1 is a plan view of the present agitator mounted to a storage bin unloader;

FIG. 2 is an enlarged pictorial view of a portion of the present agitator;

FIG. 3 is a fragmentary view illustrating a splicer bracket for the present agitator; and FIG. 4 is an enlarged sectional view illustrating a mounting bracket for the present agitator.

DETAILED DESCRIPTION OF A PREFERRED EMBODIMENT

The present invention is illustrated in the attached drawings for use in conjunction with a storage bin unloader device 10. Such devices 10 are used for emptying particulate material from an upright storage bin 11. Typically, such storage bins 11 include a substantially horizontal floor 12 and a central outlet sump 13. The unloading device 10 includes an auger assembly 14 extending radially from the central outlet sump 13. Auger assembly 14 is powered to rotate in a forward direction about a vertical axis along the floor of the bin. An auger drive means 15 is provided for rotating augers about a longitudinal auger axis. The rotating augers within the auger assembly 14 will engage and move particulate material toward the central outlet sump 13. The augers are encased partially within a coaxial tubular casing 16. The casing includes forwardly facing openings that allow passage of particulate material inwardly to engage the rotating augers therein.

The unloader assembly may be similar to that disclosed in U.S. Pat. No. 3,647,094 granted to the applicant, William J. Jackson, on Mar. 7, 1972. Portions of that patent regarding the auger assemblies and drive mechanisms are hereby incorporated by reference into the present application.

The present agitator is generally designated in the accompanying drawings by the reference character 20. The agitator 20 is adapted to be mounted to an unloading device 10 along a forward side thereof to engage and agitate particulate material ahead of the auger assembly prior to engagement of the particulate material with the auger.

The present agitator assembly 20 is mounted by bracket means 21 to the tubular casing 16 of the unloading device. The bracket means 21 supports a central shaft 22 that is rotatably mounted thereto through a bearing means 23. The bearing means 23 defines the rotating axis for the central shaft as being substantially radial with respect to the vertical pivot axis and parallel to the axis of rotation for the auger.

A plurality of longitudinally spaced discs 24 are mounted to the central shaft 22. It is noted that the shape of the discs is not critical, although it is preferred that they be circular. For example, the discs may assume polygonal or even star shaped configurations so long as they perform the function of mounting a number of longitudinally oriented agitator bars 25 at radially spaced positions with respect to the axis of shaft 22. The bars 25 are spaced angularly about the discs 24 and extend longitudinally from one disc to another along the full length of the agitator 20.

A drive means 26 is provided to rotate the central shaft 22 and agitator bars 25 about the shaft axis. The drive means is mounted by a means 27 to the tubular casing for the unloading device. Drive means 26 preferably includes a hydraulic motor. The hydraulic motor is connected to a hydraulic pump 15a that is driven by the same means that rotate the auger. The agitator may therefore operate in direct response to operation of the attached unloading device.

An adjusting means 31 (FIG. 4) is provided, adapted to mount the agitator to the tubular casing for upward or downward pivotal adjusting movement to determine the height of the discs and rods above the bin floor. Adjusting means 31 includes a pivot mount 32 that mounts the bracket means 21 to the tubular casing. Adjusting bolts 33 threadably engage the bracket and abut the casing to selectively pivot the brackets 21 about the axis of the pivot mount 32. Turning the bolts 33 one way or another will selectively adjust the operative height of the central shaft 22 and agitator bars 25 in relation to the floor surface. In some situations, particularly with beans, it may be desirable to have the agitator bars actually engage the floor surface. In this manner the agitator bars will scrape the caked material from the floor surface and direct it rearwardly toward the auger.

The agitator bars 25 are somewhat "twisted" about the central shaft 22. Preferably, each agitator bar 25 extends helically over three adjacent discs, starting at one end from a first point 38 on a front disc 24a and ending at a third point 44 on a third disc 24c that is angularly spaced from the first point 38. This concept is best illustrated with reference to FIG. 2. Each bar 25 extends from the first disc 24a at point 38 thereon to a second disc 24b where it is mounted to the second disc at a second point 40. The second point 40 is angularly spaced from the first point about the axis of the shaft 22. Preferably, each bar extends approximately 90° between discs. Each bar 25 extends on from the second disc 24b to the third disc 24c where it is mounted thereto at the third point 44. Point 44 is preferably 180° from the first point 38 and 90° from the second point about the axis of shaft 22.

All the illustrated agitator bars 25 are "twisted" in the same direction about the central shaft 22 so as to impart a directional motion of the particulate material axially toward the outlet sump. At least two and preferably four agitator bars 25 are attached to each disc 24.

The central shaft 22, discs 24, and agitator bars 25 may be provided in elongated separable sections to allow separation thereof in conjunction with a form of unloader assembly that is also radially separable. The separation may be facilitated through splicer brackets 43 mounted to the shaft 22, joining otherwise loose ends thereof. The splicer brackets 43 may be bolted to the central shaft 22 or otherwise removably attached (FIG. 3).

During operation, the drive means 26 is operated in conjunction with the auger drive means to rotate the agitator bars about the central shaft axis. The rotating bars engage particulate material ahead of the unloading device to break up clumps of particulate material before they are engaged by the auger mechanisms. If the bracket means 21 is adjusted downwardly such that the bars 25 move close to the bin floor, any compacted material along the bin floor will be engaged by the agitator bars and swept clear of the floor into the forward paths of the unloader auger. The rotating bars break up and agitate the particulate material so that is is evenly engaged along the unloader mechanism and even flow of the particulate material is encouraged toward the outlet sump.

The above description and accompanying drawings are given by way of example to set forth a preferred form of the present invention. The following claims are given to define the scope of my invention.

What I claim is:

1. An agitator for particulate material unloading devices that include an auger assembly extending radially from a central outlet sump of a circular bin with the auger being powered to pivot in a forward direction about a vertical axis along the floor of the bin and with auger drive means for rotating the auger assemblies about a radial auger axis to engage and move particulate material toward the central outlet sump, the agitator comprising:

bracket means adapted to be mounted to the auger assembly and projecting forwardly therefrom;

bearing means on the bracket means;

a central shaft adapted to extend along the length of the auger assembly journalled in the bracket means for rotation about a central shaft axis;

discs affixed to the central shaft at spaced intervals thereon;

axial agitator bars extending between the discs and mounted to the discs at radially spaced locations relative to the central shaft axis; and drive means for rotating the central shaft and agitator bars about the central shaft axis.

2. The agitator as defined by claim 1 wherein the drive means is adapted to be connected to the auger drive means for operation in response to operation of the auger drive means.

3. The agitator as defined by claim 1 wherein the agitator bars extend from one disc to another in succession along the central shaft from a first point on one disc to a point on an adjacent disc spaced angularly about the central shaft axis from the first point.

4. The agitator as defined by claim 1 wherein there are at least two agitator bars mounted to each disc and wherein the agitator bars are helically twisted about the central shaft axis in the same direction.

5. The agitator as defined by claim 1 wherein the central shaft is provided with splicer bracket means to permit axial separation of the shaft into separate sections.

6. The agitator as defined in claim 1 wherein the bracket means includes adjusting means adapted to adjust the height of the agitator bars above the floor of the bin.

7. An agitator as defined by claim 1 for particulate material unloading devices having an auger drive means including a hydraulic pump, wherein the drive means includes a hydraulic motor operatively connected to the hydraulic pump.